United States Patent
Wu

(10) Patent No.: US 8,083,403 B2
(45) Date of Patent: Dec. 27, 2011

(54) RADIATOR COVER

(75) Inventor: Chih-Bin Wu, Yongkang (TW)

(73) Assignee: Coplus, Inc., Yongkang (TW)

( * ) Notice: Subject to any disclaimer, the term of this patent is extended or adjusted under 35 U.S.C. 154(b) by 324 days.

(21) Appl. No.: 12/475,621

(22) Filed: Jun. 1, 2009

(65) Prior Publication Data
US 2010/0098132 A1    Apr. 22, 2010

(51) Int. Cl.
*G01K 1/08* (2006.01)
*G01K 1/14* (2006.01)

(52) U.S. Cl. ............... 374/146; 374/141; 374/208

(58) Field of Classification Search .......... 374/146, 374/208, E1.011, E1.018, E1.019; 116/216, 116/305, DIG. 1; 220/DIG. 32
See application file for complete search history.

(56) References Cited

U.S. PATENT DOCUMENTS

| | | | |
|---|---|---|---|
| 1,330,457 A * | 2/1920 | Wicke | 73/292 |
| 1,713,107 A * | 5/1929 | Veitch | 374/142 |
| 5,199,297 A * | 4/1993 | Lin et al. | 73/52 |
| 7,165,883 B2 * | 1/2007 | Nimberger et al. | 374/148 |
| 7,201,513 B2 * | 4/2007 | Nakabayashi | 374/208 |

FOREIGN PATENT DOCUMENTS

GB    2027884 A  *  2/1980

* cited by examiner

*Primary Examiner* — Amy Cohen Johnson
(74) *Attorney, Agent, or Firm* — Shook, Hardy & Bacon LLP

(57) ABSTRACT

A radiator cover includes a base seat with a mounting portion. A thermometer includes a temperature-indicating portion disposed within the mounting portion, an externally threaded portion extending downwardly from the temperature-indicating portion and having a bottom surface, and a sensor portion extending downwardly from the bottom surface. A threaded seat includes an internally threaded portion engaging the externally threaded portion, and an annular inner surface disposed below the internally threaded portion and confronting the bottom surface. An annular water seal is disposed between the bottom surface and the annular inner surface of the threaded seat to establish a water-tight seal therebetween.

7 Claims, 4 Drawing Sheets

RADIATOR COVER

BACKGROUND OF THE INVENTION

1. Field of the Invention

The invention relates to a radiator cover, more particularly to a radiator cover capable of indicating temperature.

2. Description of the Related Art

Referring to FIGS. 1 and 2, a conventional radiator cover 1 mounted on a vehicle comprises a base seat 11, a thermometer 12 mounted on the base seat 11, and a bottom seat 13 connected to a bottom end of the base seat 11. The base seat 11 comprises an octagonal mounting portion 111, and an upright hole 110 that is formed through the base seat 11. The thermometer 12 includes a circular temperature-indicating portion 121 disposed within the mounting portion 111 of the base seat 11, and an elongate sensor portion 122 extending downwardly from the temperature-indicating portion 121 and disposed within the upright hole 110 in the base seat 11, and having a pointed lower end portion extending outwardly of the upright hole 110. The bottom seat 13 has a top end connected to the bottom end of the base seat 11 such that at least one gap is formed therebetween. The bottom seat 13 includes a water-contacting tube 133 having an open upper end and a closed lower end. The sensor portion 122 of the thermometer 12 extends into the water-contacting tube 133. The temperature-indicating portion 121 of the radiator cover 1 is provided for warning purposes so that users will not attempt to open the radiator cover 1 when the temperature of the radiator is high.

However, high temperature steam in the radiator flows into the upright hole 110 of the base seat 11 via the gap between the top end of the bottom seat 13 and the bottom end of the base seat 11. As a result, the high temperature steam will flow from the upright hole 110 into the temperature-indicating portion 121, thus causing damage to the components in the temperature-indicating portion 121 and decreasing the accuracy of the thermometer 12.

SUMMARY OF THE INVENTION

Therefore, the object of the present invention is to provide a radiator cover capable of alleviating the above drawbacks of the prior art.

Accordingly, a radiator cover of the present invention comprises a base seat including a mounting portion and an upright hole that is formed through the base seat. A thermometer includes a temperature-indicating portion disposed within the mounting portion of the base seat, an externally threaded portion extending downwardly from the temperature-indicating portion and having a bottom surface, and a sensor portion extending downwardly from the bottom surface of the externally threaded portion. The sensor portion is disposed within the upright hole in the base seat, and has a lower end portion extending outwardly of the upright hole. A threaded seat includes an internally threaded portion engaging the externally threaded portion of the thermometer, and an annular inner surface disposed below the internally threaded portion and confronting the bottom surface of the externally threaded portion. An annular water seal is disposed between the bottom surface of the externally threaded portion of the thermometer and the annular inner surface of the threaded seat to establish a water-tight seal therebetween.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
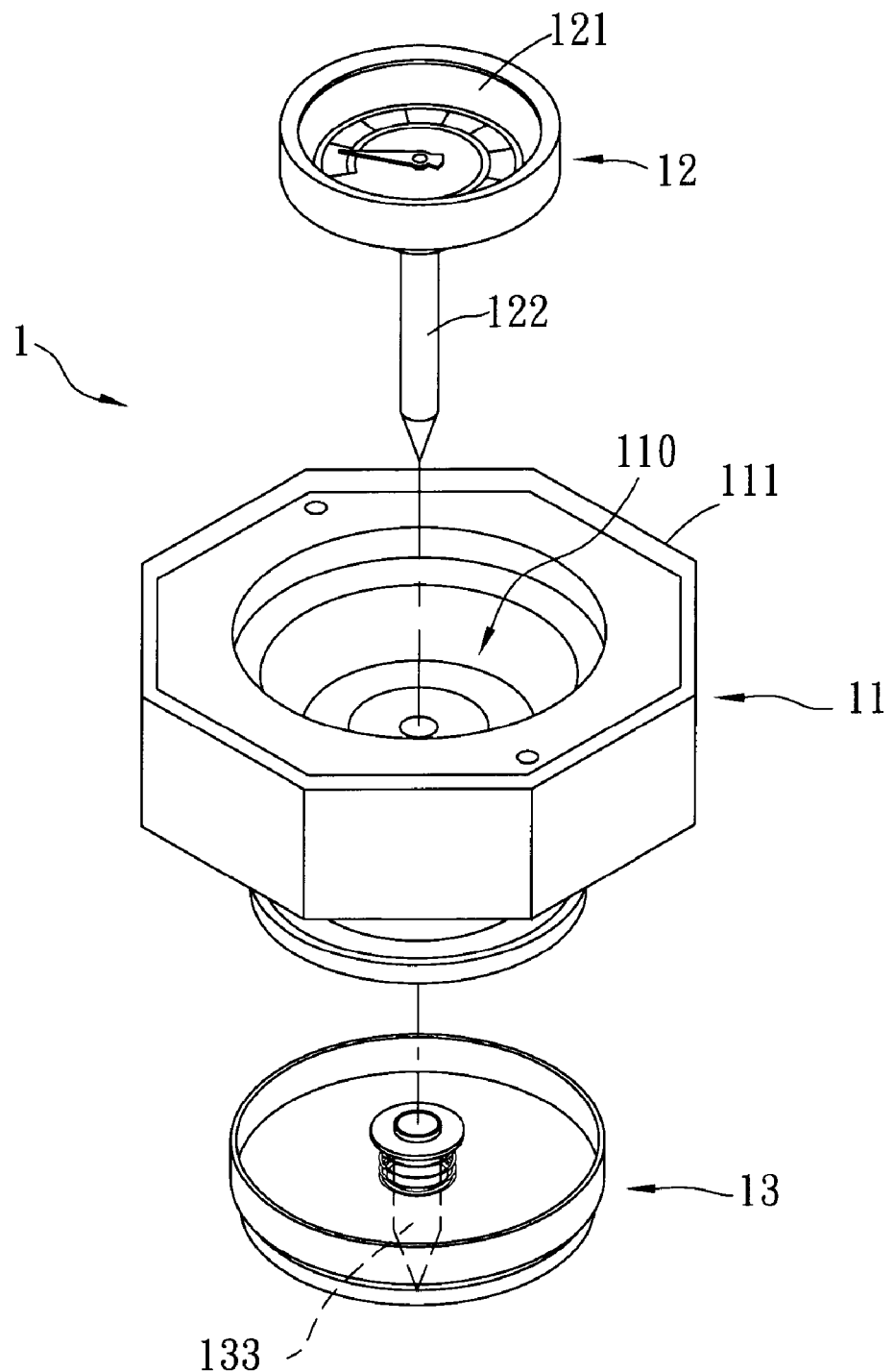
FIG. 1 is an exploded perspective view of a conventional radiator cover capable of indicating temperature.
Figure 2:
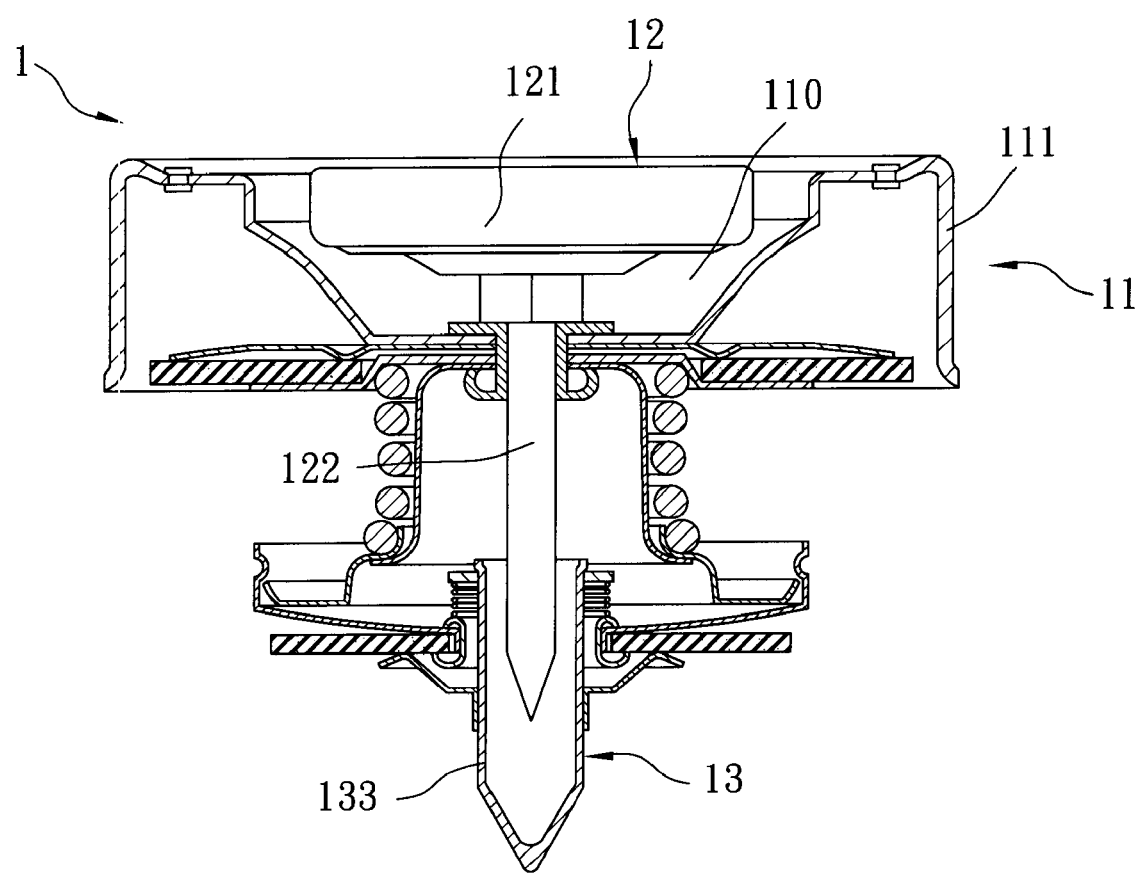
FIG. 2 is a partly sectional view of the radiator cover of FIG. 1.
Figure 3:
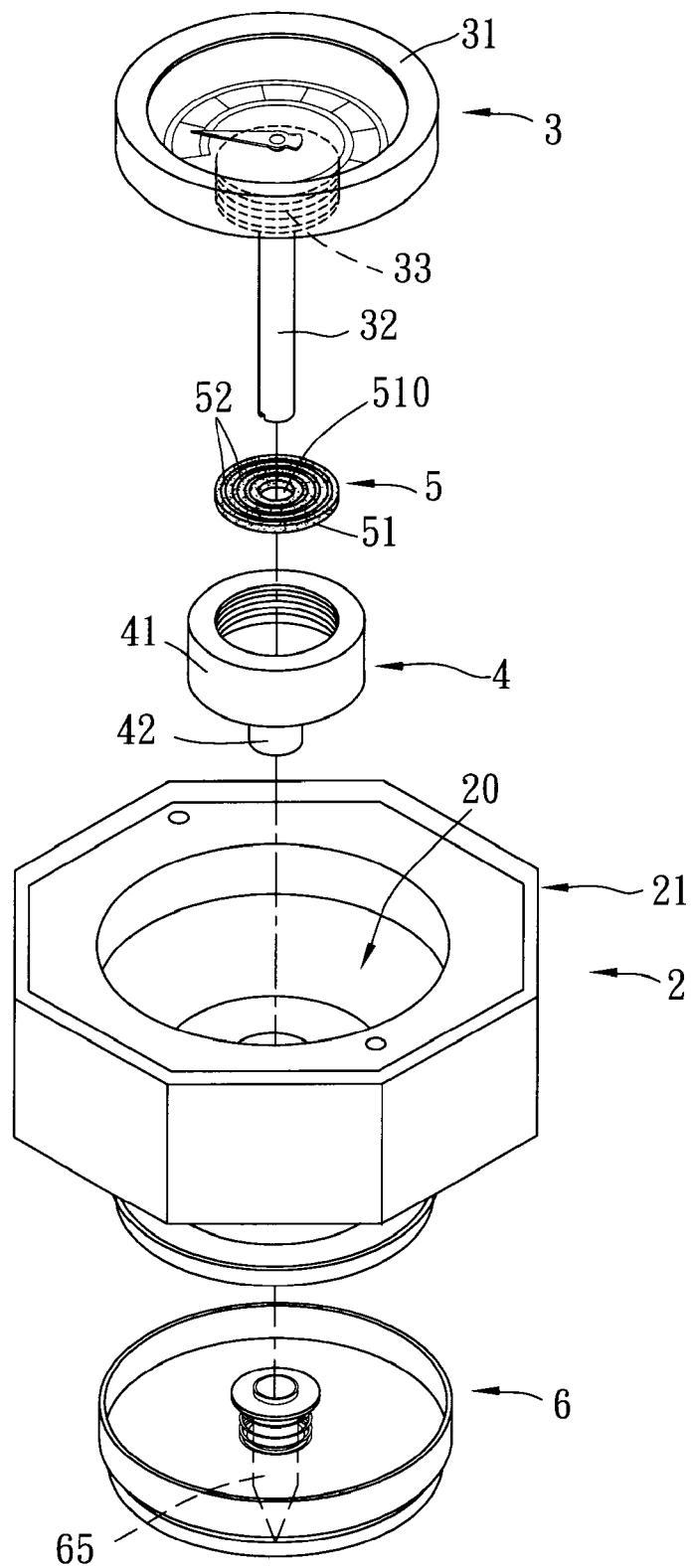
FIG. 3 is an exploded perspective view of a preferred embodiment of a radiator cover capable of indicating temperature according to the present invention.
Figure 4:
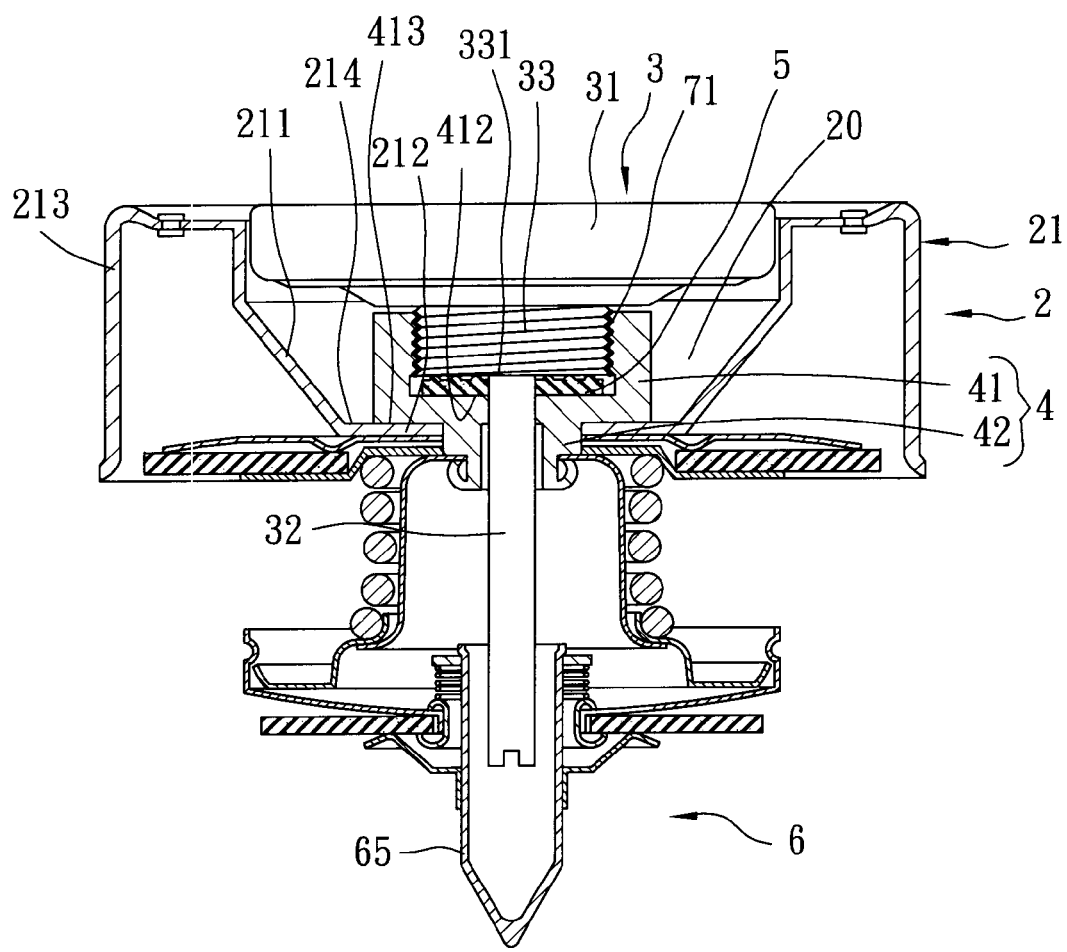
FIG. 4 is a partly sectional view of the preferred embodiment of the radiator cover of the present invention.

As shown in FIGS. 3 and 4, a preferred embodiment of a radiator cover according to the present invention comprises a base seat 2, a thermometer 3, a threaded seat 4, an annular water seal configured as a washer 5, and a bottom seat 6.

The base seat 2 includes an octagonal mounting portion 21 and an upright hole 20 that is formed through the base seat 2. The mounting portion 21 is hollow, and has an outer surrounding wall 213 disposed at an outer peripheral portion thereof, an inner surrounding wall 211 disposed inside the outer surrounding wall 213 and having an upper end connected to the outer surrounding wall 213 and a lower end, and an annular base wall 212 extending radially and inwardly from the lower end of the inner surrounding wall 211 and having a base surface 214 that faces upwardly.

The thermometer 3 includes a temperature-indicating portion 31 disposed within the mounting portion 21 of the base seat 2, an externally threaded portion 33 extending downwardly from the temperature-indicating portion 31 and having a bottom surface 331, and a sensor portion 32 extending downwardly from the bottom surface 331 of the externally threaded portion 33, disposed within the upright hole 20 in the base seat 2, and having a lower end portion extending outwardly of the upright hole 20.

The threaded seat 4 includes an internally threaded portion 41 engaging the externally threaded portion 33 of the thermometer 3, and an annular inner surface 412 disposed below the internally threaded portion 41 and confronting the bottom surface 331 of the externally threaded portion 33. The internally threaded portion 41 of the threaded seat 4 has an annular outer surface 413 facing downwardly and abutting against the base surface 214 of the base wall 212. The threaded seat 4 further includes an extension pipe 42 extending downwardly from the internally threaded portion 41. The annular outer surface 413 is disposed around and above the extension pipe 42. The sensor portion 32 of the thermometer 3 extends through the extension pipe 42. A sealing adhesive 71 is applied between the internally threaded portion 41 of the threaded seat 4 and the externally threaded portion 33 of the thermometer 3. The sealing adhesive 71 may be one of a conventional glue and a thread locking agent to establish a water-tight seal between the internally threaded portion 41 of the threaded seat 4 and the externally threaded portion 33 of the thermometer 3.

The washer 5 is formed with a central hole 510 and is disposed between the bottom surface 331 of the externally threaded portion 33 of the thermometer 3 and the annular inner surface 412 of the threaded seat 4 to establish a water-tight seal therebetween. The sensor portion 32 of the thermometer 3 extends through the central hole 510 such that the washer 5 is sleeved on the sensor portion 32 in a tight fitting manner. The washer 5 has an annular washer body 51 and a plurality of spaced-apart concentric protrusions 52 protruding upwardly from the washer body 51.

It should be noted that, while the water seal of this invention is exemplified using the washer 5, an o-ring may be employed in other embodiments of this invention.

The bottom seat 6 has a top end connected to a bottom end of the base seat 2 in a known manner such that at least one gap is formed therebetween. The bottom seat 6 includes a water-contacting tube 65 having an open upper end and a closed lower end. The sensor portion 32 of the thermometer 3 extends into the water-contacting tube 65. When the radiator cover is mounted on a radiator, heat can be transferred from water in the radiator to the sensor portion 32 through the water-contacting tube 65, and air between the water engaging tube 65 and the sensor portion 32. Hence, the temperature-indicating portion 31 of the thermometer 3 indicates the temperature of the water in the radiator. Since the bottom seat 6 is not pertinent to the claimed invention, the configuration of the bottom seat 6 will not be described in detail.

To sum up, the advantages of the radiator cover according to the present invention are as follows. In the present invention, the threaded seat 4 is disposed below the temperature-indicating portion 31 of the thermometer 3, and the washer 5 is disposed between the bottom surface 331 of the externally threaded portion 33 of the thermometer 3 and the annular inner surface 412 of the threaded seat 4 to establish the water-tight seal therebetween. The water-tight seal between the threaded seat 4 and the thermometer 3 can prevent steam in the radiator from flowing upwardly to damage the temperature-indicating portion 31. Therefore, the service life and the accuracy of the thermometer 3 are improved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A radiator cover comprising:
    a base seat including a mounting portion and an upright hole that is formed through said base seat;
    a thermometer including a temperature-indicating portion disposed within said mounting portion of said base seat, an externally threaded portion extending downwardly from said temperature-indicating portion and having a bottom surface, and a sensor portion extending downwardly from said bottom surface of said externally threaded portion, disposed within said upright hole in said base seat, and having a lower end portion extending outwardly of said upright hole;
    a threaded seat including an internally threaded portion engaging said externally threaded portion of said thermometer, and an annular inner surface disposed below said internally threaded portion and confronting said bottom surface of said externally threaded portion; and
    an annular water seal being disposed between said bottom surface of said externally threaded portion of said thermometer and said annular inner surface of said threaded seat to establish a water-tight seal therebetween,
    wherein said mounting portion is hollow, and has an outer surrounding wall disposed at an outer peripheral portion thereof, an inner surrounding wall disposed inside said outer surrounding wall and having an upper end connected to said outer surrounding wall and a lower end, and an annular base wall extending radially and inwardly from said lower end of said inner surrounding wall and having a base surface that faces upwardly, said internally threaded portion of said threaded seat having an annular outer surface abutting against said base surface of said base wall.

2. The radiator cover as claimed in claim 1, wherein said water seal is configured as a washer, and is formed with a central hole, said sensor portion of said thermometer extending through said central hole such that said washer is sleeved on said sensor portion in a tight fitting manner.

3. The radiator cover as claimed in claim 1, wherein a sealing adhesive is applied between said internally threaded portion of said threaded seat and said externally threaded portion of said thermometer.

4. The radiator cover as claimed in claim 3, wherein said sealing adhesive is a thread locking agent.

5. The radiator cover as claimed in claim 1, wherein said threaded seat further includes an extension pipe extending downwardly from said internally threaded portion, and an annular outer surface facing downwardly, disposed around and above said extension pipe, and abutting against said mounting portion of said base seat, said sensor portion of said thermometer extending through said extension pipe.

6. The radiator cover as claimed in claim 1, further comprising a bottom seat having a top end connected to a bottom end of said base seat such that at least one gap is formed therebetween, said bottom seat including a water-contacting tube having an open upper end and a closed lower end, said sensor portion of said thermometer extending into said water-contacting tube.

7. The radiator cover as claimed in claim 1, wherein said water seal is configured as a washer, and has an annular washer body and a plurality of spaced-apart concentric protrusions protruding upwardly from said washer body.

* * * * *